H. M. BULLITT.
Plow-Carriages.
No. 143,434. Patented Oct. 7, 1873.
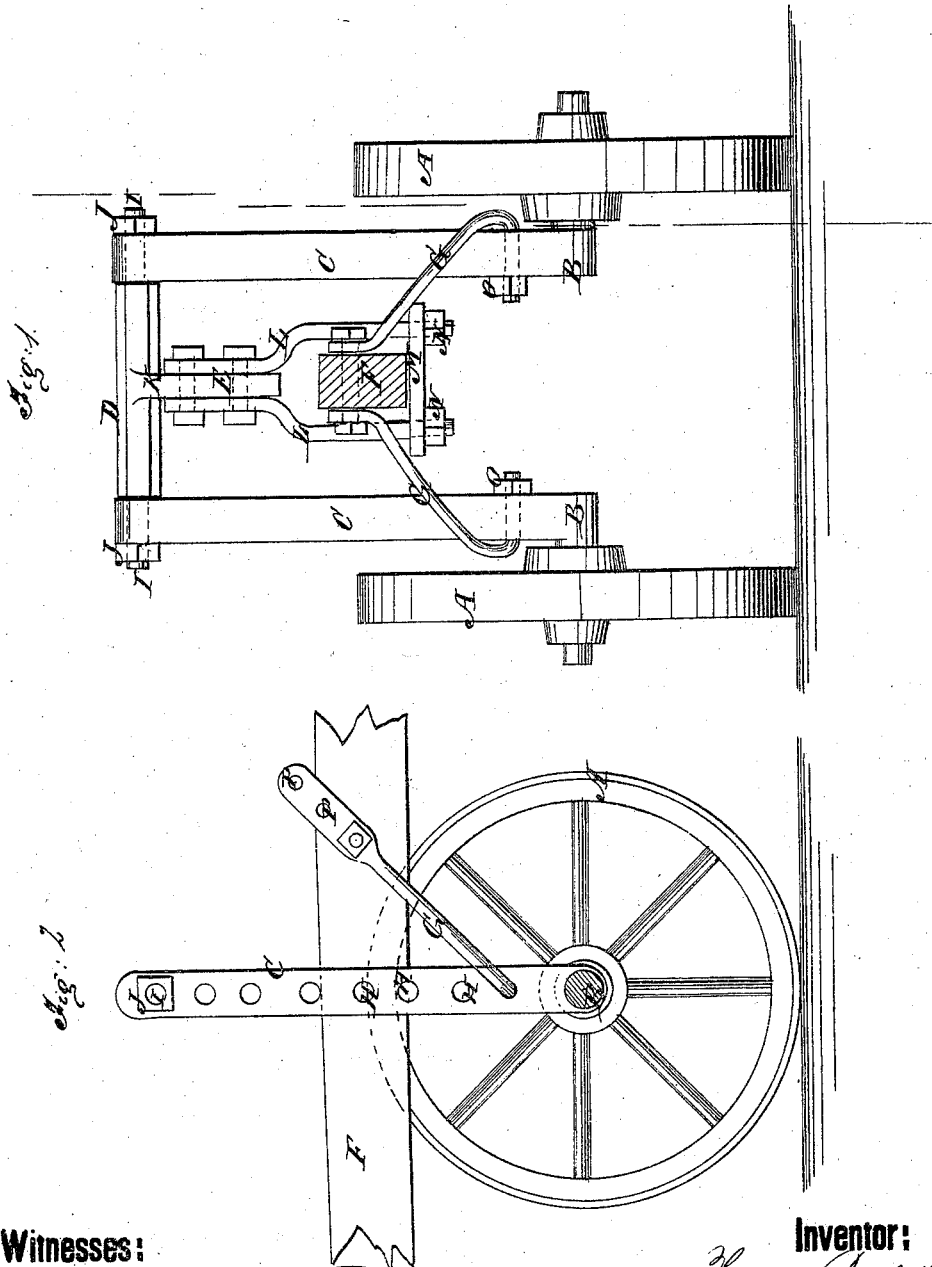
Witnesses:
Inventor:
H. M. Bullitt,
Per
Attorneys.

UNITED STATES PATENT OFFICE.

HENRY M. BULLITT, OF LOUISVILLE, KENTUCKY.

IMPROVEMENT IN PLOW-CARRIAGES.

Specification forming part of Letters Patent No. 143,434, dated October 7, 1873; application filed June 28, 1873.

*To all whom it may concern:*

Be it known that I, HENRY M. BULLITT, of Louisville, in the county of Jefferson and State of Kentucky, have invented a new and Improved Plow-Carriage, of which the following is a specification:

The invention consists of independent axles for the truck-wheels, having a long upright arm at right angles to them inside of the wheels, said arm having a series of holes at short distances apart, and connected by a short axle, which can be shifted higher or lower by changing it in the holes. From the center of this arm the beam is hung by a crotched hanger, and the beam is connected by adjustable braces with the lower ends of the arms to maintain them in the upright position. The depth of the furrow is governed by the position of the suspending-axle in the arms, and the plow is supported entirely above the ground, for transporting it from place to place, by adjusting the suspending-axle in the top holes.

The truck-wheels can be placed so close together, by using a short suspending-axle, that both can be run on the unplowed ground, the plow being far enough behind the wheels to admit of it. By using a longer axle one wheel can run in the furrow, in which case the suspending-axle will be placed as much higher in the arm of the furrow-wheel than in the other as the depth of the furrow.

Figure 1 is a front elevation of the truck and section of the beam, and Fig. 2 is a longitudinal section taken on the line $y\ y$.

Similar letters of reference indicate corresponding parts.

In the drawing, A represents truck-wheels of the ordinary construction; C, uprights, which are provided at their lower ends with outwardly-projecting axles B, and are connected together at their upper ends by an axle, D, from the middle of which depends a hanger, K. Connected to this hanger by bolts is a stirrup composed of bent rods L and crosspiece M, the latter being secured upon the rods L by screw-nuts N. F is a plow-beam, to the side of which the upper ends of the braces G are bolted, the lower ends of said braces being fitted into corresponding holes of the series of holes with which the uprights are provided. The braces consist of bent iron rods fitted at one end in the arms, and secured by nuts O, and bolted near the other ends to the beam. They are provided with a series of holes, P, to shift forward or backward on the beam, and in some measure vary the height of the plow thereby.

The plow will be attached to the beam in any approved way. It may be either right or left hand. This carriage will support the plow firmly, and control it better than it can be by hand, and it will relieve the horses of considerable pressure on the back, common in the use of ordinary plows by the tendency to run into the ground, which, in this case, is sustained by the carriage altogether.

Having thus described my invention, I claim as new and desire to secure by Letters Patent—

The uprights C, provided with axles B at their lower ends, and connected together at top by an axle, D, upon which depends a hanger, K, in combination with the stirrup L L M, brace-rods G G, and adjusting-holes H P, and plow-beam F, constructed and arranged as and for the purpose set forth.

HENRY M. BULLITT.

Witnesses:
  THOS. W. BULLITT,
  W. O. HARRIS.